(12) United States Patent
Joshi

(10) Patent No.: US 7,949,757 B2
(45) Date of Patent: *May 24, 2011

(54) HOST-LEVEL POLICIES FOR GLOBAL SERVER LOAD BALANCING

(75) Inventor: Prajakta S. Joshi, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/938,232

(22) Filed: Nov. 2, 2010

(65) Prior Publication Data

US 2011/0099261 A1    Apr. 28, 2011

Related U.S. Application Data

(63) Continuation of application No. 12/506,130, filed on Jul. 20, 2009, now Pat. No. 7,840,678, which is a continuation of application No. 10/839,919, filed on May 6, 2004, now Pat. No. 7,584,301.

(51) Int. Cl.
*G06F 15/173* (2006.01)

(52) U.S. Cl. ........ 709/226; 709/203; 709/217; 709/221; 709/224; 709/235; 709/241; 709/244; 718/105

(58) Field of Classification Search .................. 709/203, 709/217, 221, 224, 226, 235, 241, 244; 718/105
See application file for complete search history.

(56) References Cited

U.S. PATENT DOCUMENTS

| | | | |
|---|---|---|---|
| 5,031,094 A | 7/1991 | Toegel et al. | |
| 5,359,593 A | 10/1994 | Derby et al. | |
| 5,867,706 A | 2/1999 | Martin et al. | |
| 5,948,061 A | 9/1999 | Merriman et al. | |
| 5,951,634 A | 9/1999 | Sitbon et al. | |
| 6,006,269 A | 12/1999 | Phaal | |
| 6,006,333 A | 12/1999 | Nielsen | |
| 6,092,178 A | 7/2000 | Jindal et al. | |
| 6,112,239 A | 8/2000 | Kenner et al. | |
| 6,115,752 A | 9/2000 | Chauhan | |
| 6,119,143 A | 9/2000 | Dias et al. | |
| 6,128,279 A | 10/2000 | O'Neil et al. | |
| 6,128,642 A | 10/2000 | Doraswamy et al. | |
| 6,148,410 A | 11/2000 | Baskey et al. | |
| 6,157,649 A | 12/2000 | Peirce et al. | |
| 6,167,445 A | 12/2000 | Gai et al. | |

(Continued)

OTHER PUBLICATIONS

Final Office Action, mailed Aug. 12, 2010, for U.S. Appl. No. 12/177,021, 6 pages.

(Continued)

*Primary Examiner* — Michael Won
(74) *Attorney, Agent, or Firm* — Schwabe, Williamson & Wyatt, P.C.

(57) ABSTRACT

In a network, a user can configure host-level policies usable for load balancing traffic to servers of a domain. A global server load balancing (GSLB) switch provides load balancing to the servers, and is configured with the GSLB host-level policies. Users can define a host-level policy (alternatively or additionally to a globally applied GSLB policy) and apply the host-level policy to hosts in domains configured on the GSLB switch. Thus, the user can enable different policies for different hosts. This allows the user to have the flexibility to control metrics used for selection of a best address for querying clients, as well as the metric order and additional parameters used in the GSLB process, at the host level.

14 Claims, 5 Drawing Sheets

U.S. PATENT DOCUMENTS

| | | | |
|---|---|---|---|
| 6,167,446 A | 12/2000 | Lister et al. | |
| 6,178,160 B1 | 1/2001 | Bolton et al. | |
| 6,182,139 B1 | 1/2001 | Brendel | |
| 6,195,691 B1 | 2/2001 | Brown | |
| 6,233,604 B1 | 5/2001 | Van Horne et al. | |
| 6,262,976 B1 * | 7/2001 | McNamara | 370/254 |
| 6,286,039 B1 | 9/2001 | Van Horne et al. | |
| 6,286,047 B1 | 9/2001 | Ramanathan et al. | |
| 6,304,913 B1 | 10/2001 | Rune | |
| 6,317,775 B1 | 11/2001 | Coile et al. | |
| 6,324,177 B1 | 11/2001 | Howes et al. | |
| 6,324,580 B1 | 11/2001 | Jindal et al. | |
| 6,327,622 B1 | 12/2001 | Jindal et al. | |
| 6,336,137 B1 | 1/2002 | Lee et al. | |
| 6,381,627 B1 | 4/2002 | Kwan et al. | |
| 6,389,462 B1 | 5/2002 | Cohen et al. | |
| 6,393,473 B1 | 5/2002 | Chu | |
| 6,405,252 B1 | 6/2002 | Gupta et al. | |
| 6,411,998 B1 | 6/2002 | Bryant et al. | |
| 6,427,170 B1 | 7/2002 | Sitaraman et al. | |
| 6,434,118 B1 | 8/2002 | Kirschenbaum | |
| 6,438,652 B1 | 8/2002 | Jordan et al. | |
| 6,446,121 B1 | 9/2002 | Shah et al. | |
| 6,449,657 B2 | 9/2002 | Stanbach, Jr. et al. | |
| 6,470,389 B1 | 10/2002 | Chung et al. | |
| 6,473,802 B2 | 10/2002 | Masters | |
| 6,480,508 B1 | 11/2002 | Mwikalo et al. | |
| 6,487,555 B1 | 11/2002 | Bharat et al. | |
| 6,490,624 B1 | 12/2002 | Sampson et al. | |
| 6,513,061 B1 | 1/2003 | Ebata et al. | |
| 6,542,964 B1 | 4/2003 | Scharber | |
| 6,549,944 B1 | 4/2003 | Weinberg et al. | |
| 6,578,066 B1 | 6/2003 | Logan et al. | |
| 6,578,077 B1 | 6/2003 | Rakoshitz et al. | |
| 6,606,643 B1 | 8/2003 | Emens et al. | |
| 6,611,861 B1 | 8/2003 | Schairer et al. | |
| 6,647,009 B1 | 11/2003 | Kubota et al. | |
| 6,665,702 B1 | 12/2003 | Zisapel et al. | |
| 6,681,232 B1 | 1/2004 | Sistanizadeh et al. | |
| 6,681,323 B1 | 1/2004 | Fontanesi et al. | |
| 6,691,165 B1 | 2/2004 | Bruck et al. | |
| 6,725,253 B1 | 4/2004 | Okano et al. | |
| 6,745,241 B1 | 6/2004 | French et al. | |
| 6,748,416 B2 | 6/2004 | Carpenter et al. | |
| 6,754,699 B2 | 6/2004 | Swildens et al. | |
| 6,760,775 B1 | 7/2004 | Anerousis | |
| 6,772,211 B2 | 8/2004 | Lu et al. | |
| 6,779,017 B1 | 8/2004 | Lamberton et al. | |
| 6,789,125 B1 | 9/2004 | Aviani et al. | |
| 6,795,434 B1 | 9/2004 | Kumar et al. | |
| 6,801,949 B1 | 10/2004 | Bruck et al. | |
| 6,810,411 B1 | 10/2004 | Coughlin et al. | |
| 6,826,198 B2 | 11/2004 | Turina et al. | |
| 6,839,700 B2 | 1/2005 | Doyle et al. | |
| 6,850,984 B1 | 2/2005 | Kalkunte et al. | |
| 6,874,152 B2 | 3/2005 | Vermeire et al. | |
| 6,879,995 B1 | 4/2005 | Chinta et al. | |
| 6,880,000 B1 | 4/2005 | Tominaga et al. | |
| 6,883,028 B1 | 4/2005 | Johnson et al. | |
| 6,898,633 B1 | 5/2005 | Lyndersay et al. | |
| 6,901,081 B1 | 5/2005 | Ludwig | |
| 6,920,498 B1 | 7/2005 | Gourlay et al. | |
| 6,928,485 B1 | 8/2005 | Krishnamurthy et al. | |
| 6,950,848 B1 | 9/2005 | Yousefi'zadeh | |
| 6,963,914 B1 | 11/2005 | Breibart et al. | |
| 6,963,917 B1 | 11/2005 | Callis et al. | |
| 6,985,956 B2 | 1/2006 | Luke et al. | |
| 6,987,763 B2 | 1/2006 | Rochberger et al. | |
| 6,996,615 B1 | 2/2006 | McGuire | |
| 6,996,616 B1 | 2/2006 | Leighton et al. | |
| 7,000,007 B1 | 2/2006 | Valenti | |
| 7,020,698 B2 | 3/2006 | Andrews et al. | |
| 7,020,714 B2 | 3/2006 | Kalyanaraman et al. | |
| 7,028,083 B2 | 4/2006 | Levine et al. | |
| 7,032,010 B1 | 4/2006 | Swildens et al. | |
| 7,032,031 B2 | 4/2006 | Jungck et al. | |
| 7,036,039 B2 | 4/2006 | Holland | |
| 7,047,300 B1 | 5/2006 | Oehrke et al. | |
| 7,058,706 B1 | 6/2006 | Iyer et al. | |
| 7,058,717 B2 | 6/2006 | Chao et al. | |
| 7,062,642 B1 | 6/2006 | Langrind et al. | |
| 7,082,102 B1 | 7/2006 | Wright | |
| 7,086,061 B1 | 8/2006 | Joshi et al. | |
| 7,089,293 B2 | 8/2006 | Grosner et al. | |
| 7,099,915 B1 | 8/2006 | Tenereillo et al. | |
| 7,114,008 B2 | 9/2006 | Jungck et al. | |
| 7,117,269 B2 | 10/2006 | Lu et al. | |
| 7,124,188 B2 | 10/2006 | Mangipudi et al. | |
| 7,127,713 B2 | 10/2006 | Davis et al. | |
| 7,136,932 B1 | 11/2006 | Schneider et al. | |
| 7,139,242 B2 | 11/2006 | Bays | |
| 7,177,933 B2 | 2/2007 | Foth | |
| 7,185,052 B2 | 2/2007 | Day | |
| 7,197,547 B1 | 3/2007 | Miller et al. | |
| 7,206,806 B2 | 4/2007 | Pineau | |
| 7,213,068 B1 | 5/2007 | Kohli et al. | |
| 7,225,272 B2 | 5/2007 | Kelley et al. | |
| 7,240,015 B1 | 7/2007 | Karmouch et al. | |
| 7,240,100 B1 | 7/2007 | Wein et al. | |
| 7,254,626 B1 | 8/2007 | Kommula et al. | |
| 7,257,642 B1 | 8/2007 | Bridger et al. | |
| 7,260,645 B2 | 8/2007 | Bays | |
| 7,277,954 B1 | 10/2007 | Stewart et al. | |
| 7,296,088 B1 | 11/2007 | Padmanabhan et al. | |
| 7,321,926 B1 | 1/2008 | Zhang et al. | |
| 7,330,908 B2 | 2/2008 | Jungck | |
| 7,383,288 B2 | 6/2008 | Miloushev et al. | |
| 7,423,977 B1 | 9/2008 | Joshi et al. | |
| 7,441,045 B2 | 10/2008 | Skene et al. | |
| 7,454,500 B1 | 11/2008 | Hsu et al. | |
| 7,496,651 B1 | 2/2009 | Joshi | |
| 7,573,886 B1 | 8/2009 | Ono | |
| 7,574,508 B1 | 8/2009 | Kommula | |
| 7,581,009 B1 | 8/2009 | Hsu et al. | |
| 7,584,262 B1 | 9/2009 | Wang et al. | |
| 7,584,301 B1 | 9/2009 | Joshi | |
| 7,657,629 B1 | 2/2010 | Kommula | |
| 7,676,576 B1 | 3/2010 | Kommula | |
| 7,756,965 B2 | 7/2010 | Joshi | |
| 7,840,678 B2 | 11/2010 | Joshi | |
| 7,885,188 B2 | 2/2011 | Joshi | |
| 7,899,899 B2 | 3/2011 | Joshi | |
| 2001/0049741 A1 | 12/2001 | Skene et al. | |
| 2001/0052016 A1 | 12/2001 | Skene et al. | |
| 2002/0026551 A1 | 2/2002 | Kamimaki et al. | |
| 2002/0038360 A1 | 3/2002 | Andrews et al. | |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | |
| 2002/0078233 A1 | 6/2002 | Biliris et al. | |
| 2002/0087722 A1 | 7/2002 | Datta et al. | |
| 2002/0091840 A1 | 7/2002 | Pulier et al. | |
| 2002/0112036 A1 | 8/2002 | Bohannon et al. | |
| 2002/0120743 A1 | 8/2002 | Shabtay et al. | |
| 2002/0120763 A1 | 8/2002 | Miloushev et al. | |
| 2002/0124096 A1 | 9/2002 | Loguinov et al. | |
| 2002/0133601 A1 | 9/2002 | Kennamer et al. | |
| 2002/0150048 A1 | 10/2002 | Ha et al. | |
| 2002/0154600 A1 | 10/2002 | Ido et al. | |
| 2002/0188862 A1 | 12/2002 | Trethewey et al. | |
| 2002/0194324 A1 | 12/2002 | Guha | |
| 2002/0194335 A1 | 12/2002 | Maynard | |
| 2003/0018796 A1 | 1/2003 | Chou et al. | |
| 2003/0031185 A1 | 2/2003 | Kikuchi et al. | |
| 2003/0035430 A1 | 2/2003 | Islam et al. | |
| 2003/0065711 A1 | 4/2003 | Acharya et al. | |
| 2003/0065763 A1 | 4/2003 | Swildens et al. | |
| 2003/0105797 A1 | 6/2003 | Dolev et al. | |
| 2003/0115283 A1 | 6/2003 | Barbir et al. | |
| 2003/0135509 A1 | 7/2003 | Davis et al. | |
| 2003/0154239 A1 | 8/2003 | Davis et al. | |
| 2003/0210686 A1 | 11/2003 | Terrell et al. | |
| 2003/0210694 A1 | 11/2003 | Jayaraman et al. | |
| 2003/0229697 A1 | 12/2003 | Borella | |
| 2004/0019680 A1 | 1/2004 | Chao et al. | |
| 2004/0024872 A1 | 2/2004 | Kelley et al. | |

| | | | |
|---|---|---|---|
| 2004/0039847 A1 | 2/2004 | Persson et al. | |
| 2004/0064577 A1 | 4/2004 | Dahlin et al. | |
| 2004/0194102 A1 | 9/2004 | Neerdaels | |
| 2004/0249939 A1 | 12/2004 | Amini et al. | |
| 2004/0249971 A1 | 12/2004 | Klinker | |
| 2004/0259565 A1 | 12/2004 | Lucidarme | |
| 2005/0002410 A1 | 1/2005 | Chao et al. | |
| 2005/0021883 A1 | 1/2005 | Shishizuka et al. | |
| 2005/0033858 A1 | 2/2005 | Swildens et al. | |
| 2005/0086295 A1 | 4/2005 | Cunningham et al. | |
| 2005/0149531 A1 | 7/2005 | Srivastava | |
| 2005/0169180 A1 | 8/2005 | Ludwig | |
| 2005/0286416 A1 | 12/2005 | Shimonishi et al. | |
| 2006/0020715 A1 | 1/2006 | Jungck | |
| 2006/0036743 A1 | 2/2006 | Deng et al. | |
| 2006/0167894 A1* | 7/2006 | Wunner | 707/10 |
| 2006/0209689 A1 | 9/2006 | Nakano et al. | |
| 2007/0168448 A1 | 7/2007 | Garbow et al. | |
| 2007/0168547 A1 | 7/2007 | Krywaniuk | |
| 2007/0180113 A1 | 8/2007 | Van Bemmel | |
| 2008/0037420 A1 | 2/2008 | Tang | |
| 2008/0123597 A1 | 5/2008 | Arbol et al. | |
| 2008/0144784 A1 | 6/2008 | Limberg | |
| 2008/0147866 A1 | 6/2008 | Stolorz et al. | |
| 2010/0010991 A1 | 1/2010 | Joshi | |
| 2010/0011120 A1 | 1/2010 | Kommula | |
| 2010/0011126 A1 | 1/2010 | Hsu et al. | |
| 2010/0061236 A1 | 3/2010 | Joshi | |
| 2010/0082787 A1 | 4/2010 | Kommula et al. | |
| 2010/0095008 A1 | 4/2010 | Joshi | |
| 2010/0115133 A1 | 5/2010 | Joshi | |
| 2010/0121932 A1 | 5/2010 | Joshi et al. | |
| 2010/0153558 A1 | 6/2010 | Kommula | |
| 2010/0223621 A1 | 9/2010 | Joshi | |
| 2010/0293296 A1 | 11/2010 | Hsu et al. | |
| 2010/0299427 A1 | 11/2010 | Joshi | |

OTHER PUBLICATIONS

Notice of Allowance for U.S. Appl. No. 12/506,130, mailed on Oct. 12, 2010, 49 pages.
Notice of Allowance for U.S. Appl. No. 10/214,921, mailed on Apr. 3, 2009, 10 pages.
Non-Final Office Action for U.S. Appl. No. 10/305,823, Mailed Jan. 12, 2006, 16 pages.
Final Office Action for U.S. Appl. No. 10/305,823, mailed on Jul. 3, 2006, 13 pages.
Non-Final Office Action for U.S. Appl. No. 10/305,823, mailed on Jan. 3, 2007, 13 pages.
Non-Final Office Action for U.S. Appl. No. 10/305,823, mailed on Sep. 10, 2007, 17 pages.
Final Office Action for U.S. Appl. No. 10/305,823, mailed on Mar. 24, 2008, 18 pages.
Advisory Action for U.S. Appl. No. 10/305, 823, mailed on Jul. 9, 2008, 4 pages.
Examiner's Response to Appeal Brief for U.S. Appl. No. 10/305,823, mailed on Mar. 4, 2009, 26 pages.
Office Communication Regarding Prior Art Relied Upon in the Rejection of Claims Under Appeal, for U.S. Appl. No. 10/305,823, mailed on Apr. 13, 2009 2 pages.
Non-Final Office Action for U.S. Appl. No. 10/674,627, mailed on Jun. 5, 2006.
Final Office Action for U.S. Appl. No. 10/674,627, mailed on Nov. 3, 2006, 16 pages.
Non-Final Office Action for U.S. Appl. No. 10/674,627, mailed on Jul. 30, 2007, 9 pages.
Final Office Action for U.S. Appl. No. 10/674,627, mailed on Apr. 11, 2008, 17 pages.
Non-Final Office Action for U.S. Appl. No. 10/674,627, mailed on Dec. 23, 2008, 18 pages.
Final Office Action for U.S. Appl. No. 10/674,627, mailed on Aug. 3, 2009, 17 pages.
Advisory Action for U.S. Appl. No. 10/674,627, mailed on Oct. 16, 2009, 3 pages.
Notice of Allowance for U.S. Appl. No. 10/674,627, mailed on Aug. 19, 2010, 4 pages.
Notice of Allowance for U.S. Appl. No. 10/839,919, mailed on Mar. 5, 2008, 17 pages.
Non-Final Office Action for U.S. Appl. No. 10/839,919, mailed on Jun. 18, 2008, 15 pages.
Final Office Action for U.S. Appl. No. 10/839,919, mailed on Dec. 9, 2008, 22 pages.
Notice of Allowance for U.S. Appl. No. 10/839,919, mailed on May 14, 2009, 19 pages.
Non-Final Office Action for U.S. Appl. No. 10/840,496, mailed on Oct. 18, 2007, 22 pages.
Final Office Action for U.S. Appl. No. 10/840,496, mailed on Aug. 1, 2008, 13 pages.
Notice of Allowance for U.S. Appl. No. 10/840,496, mailed on Oct. 15, 2008, 6 pages.
Non-Final Office Action for U.S. Appl. No. 12/353,701, mailed on Nov. 4, 2009, 22 pages.
Notice of Allowance for U.S. Appl. No. 12/353,701, mailed on Apr. 9, 2010, 5 pages.
Non-Final Office Action for U.S. Appl. No. 10/924,552, Mailed Feb. 27, 2008, 30 pages.
Notice of Allowance for U.S. Appl. No. 10/924,552, Mailed May 30, 2008, 20 pages.
Non-Final Office Action for U.S. Appl. No. 12/177,021, mailed Jan. 29, 2010, 8 pages.
F5 Networks, Inc., "Keeping Up with Multi-Service Applications," A F5 Networks, Inc. White Paper Document, Jan. 2006, 8 pages, Seattle, WA.
Citrix Systems, Inc., "NetScaler Global Server Load Balancing for Presentation Server and Access Gateway (All Editions) Deployments," Design Consideration NetScaler 8.0, 2007, 16 pages, Fort Lauderdale, FL.
F5 Networks, Inc., "Optimize Application Delivery Across Your Globally Distributed Data Centers," BIG-IP Global Traffic Manager Datasheet, 2009, 8 pages, Seattle WA.
Stalvig P., "Disaster Recovery: Not Just Planning for the Worst," A F5 Networks, Inc. White Paper Document, 2008, 16 pages, F5 Networks, Inc., Seattle, WA.
Cisco Systems, Inc., "The Global Server Load Balancing Primer," A Cisco Systems, Inc. White Paper Document, 1992-2004, 20 pages, San Jose, CA.
Civil Action 10-332, Complaint for Patent Infringement with Exhibits A-G, filed on Apr. 23, 2010, 131 pages.
Civil Action 10-332, Second Amended and Supplemental Complaint for Patent Infringement with Exhibits H-I, filed on Jul. 16, 2010, 41 pages.
Civil Action CV10-03443, Complaint for Declaratory Judgment with Exhibits A-I, filed on Aug. 6, 2010, 153 pages.
Albitz, P., et al., "DNS and BIND in a Nutshell," O'Reilly & Associates, Sebastopol, CA, 1992, pp. 214-215.
Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.
Alteon WebSystems, Inc., "Enhancing Web User Experience with Global Server Load Balancing," Jun. 1999, 8 pages.
Krapf, E., "Alteon's Global Server Load Balancing," Business Communications Review, Jan. 1999, p. 60, retrieved Oct. 25, 2002, from http://www.bcr.com/bcrmag/1999/01/p60.asp, 3 pages.
Nortel Networks, "Alteon Personal Content Director," © 2001, can be retrieved from http://www.nortelnetworks.com/personalinternet, 4 pages.
IBM Corp., IBM WebSphere Performance Pack: Load Balancing with IBM SecureWay Network Dispatcher, First Edition, Chapters 1, 2, 4, and 8, Oct. 1999.
IBM Corp., SecureWay® Network Dispatcher: User's Guide—Version 2.1 for AIX, Solaris, and Windows NT, Third Edition, Chapters 3, 4, 9, 10, 11, and Appendices C & E, Mar. 1999.
Yerxa, G., "ACElerate on Fast Track for Load-Balancing," Mar. 8, 1999, retrieved Nov. 5, 2002, from http://www.networkcomputing.com/1005/1005sp2.html, pp. 1-4.
AlteonWebSystems, "PCD White Paper," AlteonWebSystems, pp. 1-8, Mar. 2001.

Cardellini, V., et al., "Dynamic Load Balancing on Web-server Systems," IEEE Internet Computing, 3(3):28-39, May-Jun. 1999.
Foundry Networks, Inc., "Server Load Balancing in Today's Web-enabled Enterprises," White Paper, pp. 1-10, Apr. 2002.
Genova, Z., et al., "Challenges in URL Switching for Implementing Globally Distributed Web Sites," IEEE, pp. 89-94, 2000.
Genova, Z., et al., "Challenges to URL Switching for Implementing Globally Distributed Web Sites," Department of Computer Science and Engineering, University of South Florida, pp. 1-9, Aug. 11, 2000.
Bestavros, Azer, "WWW Traffic Reduction and Load Balancing through Server-Based Caching," IEEE Concurrency, Jan.-Mar. 1997, pp. 56-67.
Paul, Arindam et al., "Balancing Web Server Load for Adaptable Video Distribution," IEEE, 2000, pp. 469-476.
Cisco Document, "Configuring the CSS Domain Name Service,", posted on Dec. 2000, Cisco Systems Inc., http://www.ciscosystems.com, pp. 1-13.
Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.
Doeringer et al., "Routing on Longest-Matching Prefixes," IEEE/ACM Transactions on Networking, vol. 4, No. 1, Feb. 1996, pp. 86-97.
Joshi et al., U.S. Appl. No. 11/429,177, filed May 5, 2006.
Hsu et al., U.S. Appl. No. 12/272,618, filed Nov. 17, 2008.
Devarapalli et al., U.S. Appl. No. 61/393,796, filed on Oct. 15, 2010; 43 pages.
Devarapalli et al., U.S. Appl. No. 12/916,390, filed Oct. 29, 2010; 45 pages.
Joshi, U.S. Appl. No. 13/008,321, filed Jan. 18, 2011; 36 pages.
Joshi, U.S. Appl. No. 13/023,292, filed Feb. 8, 2011; 30 pages.
Non-Final Office Action for U.S. Appl. No. 12/496,560, mailed on Sep. 17, 2010, 27 pages.
Final Office Action for U.S. Appl. No. 12/496,560, mailed on Jan. 28, 2011, 10 pages.
Final Office Action for U.S. Appl. No. 12/272,618, mailed on Nov. 26, 2010, 19 pages.
Office Action for U.S. Appl. No. 11/707,697, mailed on Nov. 22, 2010, 24 pages.
Non-Final Office Action for U.S. Appl. No. 12/635,371, mailed on Oct. 7, 2010, 44 pages.
Final Office Action for U.S. Appl. No. 12/635,371, mailed on Mar. 16, 2011, 7 pages.
Non-Final Office Action for U.S. Appl. No. 12/506,137, mailed on Oct. 7, 2010, 26 pages.
Notice of Allowance for U.S. Appl. No. 12/787,779, mailed Dec. 20, 2010, 45 pages.
Notice of Allowance for U.S. Appl. No. 12/787,779, mailed Jan. 12, 2011, 48 pages.
Notice of Allowance for U.S. Appl. No. 12/177,021, mailed Dec. 10, 2010, 20 pages.
Network Working Group, Request for Comments (RFC) 4033, "DNS Security Introduction and Requirements," Mar. 2005, 22 pages.
Network Working Group, Request for Comments (RFC) 4034, "Resource Records for the DNS Security Extensions," Mar. 2005, 31 pages.
Network Working Group, Request for Comments (RFC) 4035, "Protocol Modifications for the DNS Security Extensions," Mar. 2005, 55 pages.
National Institute of Standards and Technology (NIST), "Secure Domain Name System (DNS) Deployment Guide," Special Publication 800-81, May 2006, 103 pages.
CMP Media LLC, "VeriSign DNSSEC Interop Lab Adds Brocade, A10 Networks, BlueCat Networks," Jun. 29, 2010, can be retrieved from http://www.darkreading.com/story/showArticle.jhtml?articleID=225701776, 3 pages.
Meyer, Nathan et al., "F5 and Infoblox DNS Integrated Architecture: Offering a Complete Scalable, Secure DNS Solution," A F5 Networks, Inc. Technical Brief, 2010, 18 pages, Seattle, WA.
Silva, Peter, "DNSSEC: The Antidote to DNS Cache Poisoning and Other DNS Attacks," A F5 Networks, Inc. Technical Brief, 2009, 10 pages, Seattle, WA.

Wikimedia Foundation, Inc., "Domain Name Security Extensions," retrieved Oct. 22, 2010, from http://en.wikipedia.org/wiki/Domain_Name_System_Security_Extensions, 17 pages.
A10 Networks, Inc., "A10 Networks Announces Unique and Wide Ranging Customer-Driven Functionality for AX Series Application Delivery Controllers," News Release, Oct. 18, 2010, from http://www.a10networks.com/news/2010/101018-AX_Series_2.6.php, 2 pages.
Civil Action 10-332, Report on the Filing or Determination of an Action Regarding a Patent or Trademark, filed on Aug. 5, 2010, 2 pages.
Civil Action 10-332, Notice of Voluntary Dismissal Without Prejudice, filed on Aug. 5, 2010, 2 pages.
Civil Action CV10-03428, Complaint for Patent Infringement, Trade Secret Misappropriation, Breach of Contract, Interference with Prospective Economic Advantage, Interference with Contract, and Unfair Competition Under Cal. Bus. & Prof. Code §§ 17200 et seq., filed on Aug. 4, 2010, with Exhibits A-M, 196 pages.
Civil Action CV10-03428, First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 38 pages.
Joshi, U.S. Appl. No. 12/787,779, filed May 26, 2010.
Non-Final Office Action for U.S. Appl. No. 09/670,487, Mailed Dec. 31, 2003, 24 pages.
Final Office Action for U.S. Appl. No. 09/670,487, Mailed Sep. 21, 2004, 22 pages.
Non-Final Office Action for U.S. Appl. No. 09/670,487, Mailed Mar. 15, 2005, 18 pages.
Final Office Action for U.S. Appl. No. 09/670,487, Mailed Nov. 3, 2005, 18 pages.
Non-Final Office Action for U.S. Appl. No. 09/670,487, Mailed May 3, 2006, 21 pages.
Non-Final Office Action for U.S. Appl. No. 09/670,487, Mailed Nov. 17, 2006, 11 pages.
Final Office Action for U.S. Appl. No. 09/670,487, Mailed Oct. 30, 2007, 14 pages.
Non-Final Office Action for U.S. Appl. No. 09/670,487, Mailed Jul. 22, 2008, 11 pages.
Notice of Allowance for U.S. Appl. No. 09/670,487, Mailed Sep. 18, 2008, 7 pages.
Non-Final Office Action for U.S. Appl. No. 11/741,480, Mailed Nov. 27, 2007,12 pages.
Non-Final Office Action for U.S. Appl. No. 11/741,480, Mailed Apr. 29, 2008, 10 pages.
Final Office Action for U.S. Appl. No. 11/741,480, Mailed Oct. 31, 2008, 15 pages.
Notice of Allowance for U.S. Appl. No. 11/741,480, Mailed Apr. 10, 2009, 7 pages.
Non-Final Office Action for U.S. Appl. No. 12/272,618, mailed on Sep. 29, 2009, 16 pages.
Non-Final Office Action for U.S. Appl. No. 12/272,618, mailed on Feb. 4, 2010, 14 pages.
Non-Final Office Action for U.S. Appl. No. 10/211,822, Mailed Aug. 19, 2005, 16 pages.
Notice of Allowance for U.S. Appl. No. 10/211,822, Mailed Mar. 7, 2006, 8 pages.
Non-Final Office Action for U.S. Appl. No. 10/377,364, mailed on Sep. 22, 2006, 18 pages.
Non-Final Office Action for U.S. Appl. No. 10/377,364, mailed on Mar. 26, 2007, 14 pages.
Non-Final Office Action for U.S. Appl. No. 10/377,364, mailed on Sep. 4, 2007, 13 pages.
Final Office Action for U.S. Appl. No. 10/377,364, mailed on Apr. 9, 2008, 15 pages.
Non-Final Office Action for U.S. Appl. No. 10/377,364, mailed on Nov. 24, 2008, 19 pages.
Final Office Action for U.S. Appl. No. 10/377,364, mailed on Aug. 31, 2009, 25 pages.
Advisory Action for U.S. Appl. No. 10/377,364, mailed on Nov. 23, 2009, 3 pages.

Notice of Allowance for U.S. Appl. No. 10/377,364, mailed on Jan. 12, 2010, 5 pages.
Non-Final Office Action for U.S. Appl. No. 10/206,580, Mailed Aug. 15, 2005, 14 pages.
Final Office Action for U.S. Appl. No. 10/206,580, Mailed Mar. 9, 2006, 12 pages.
Advisory Action for U.S. Appl. No. 10/206,580, Mailed Jun. 6, 2006, 3 pages.
Non-Final Office Action for U.S. Appl. No. 10/206,580, Mailed Jul. 12, 2006, 12 pages.
Notice of Allowance for U.S. Appl. No. 10/206,580, Mailed Jan. 11, 2007, 17 pages.
Notice of Allowance for U.S. Appl. No. 10/206,580, Mailed Jul. 6, 2007, 5 pages.
Non-Final Office Action for U.S. Appl. No. 10/376,903, mailed on Jul. 17, 2006, 7 pages.
Final Office Action for U.S. Appl. No. 10/376,903, mailed on Jan. 12, 2007, 8 pages.
Non-Final Office Action for U.S. Appl. No. 10/376,903, mailed on Jun. 5, 2007, 13 pages.
Non-Final Office Action for U.S. Appl. No. 10/376,903, mailed on Feb. 20, 2008, 10 pages.
Final Office Action for U.S. Appl. No. 10/376,903, mailed on Oct. 16, 2008.
Non-Final Office Action for U.S. Appl. No. 10/376,903, mailed on Mar. 4, 2009, 8 pages.
Notice of Allowance for U.S. Appl. No. 10/376,903, mailed on Oct. 19, 2009, 4 pages.
Non-Final Office Action for U.S. Appl. No. 11/707,697, Mailed Mar. 3, 2009, 41 pages.
Requirement for Restriction/Election for U.S. Appl. No. 11/707,697, mailed on Sep. 17, 2009, 6 pages.
Final Office Action for U.S. Appl. No. 11/707,697, mailed on Jan. 12, 2010, 22 pages.
Non-Final Office Action for U.S. Appl. No. 10/214,921, mailed on Feb. 7, 2006, 7 pages.
Final Office Action for U.S. Appl. No. 10/214,921, mailed on Aug. 9, 2006, pp. 10 pages.
Advisory Action for U.S. Appl. No. 10/214,921, mailed on Sep. 21, 2006, 3 pages.
Non-Final Office Action for U.S. Appl. No. 10/214,921, mailed on Dec. 7, 2006, 11 pages.
Final Office Action for U.S. Appl. No. 10/214,921, mailed on Aug. 13, 2007, 20 pages.
Non-Final Office Action for U.S. Appl. No. 10/214,921, mailed on Nov. 15, 2007, 23 pages.
Final Office Action for U.S. Appl. No. 10/214,921, mailed on Jun. 12, 2008, 21 pages.
Non-Final Office Action for U.S. Appl. No. 10/214,921, mailed on Oct. 6, 2008, 33 pages.

* cited by examiner

HOST-LEVEL POLICIES FOR GLOBAL SERVER LOAD BALANCING

CROSS REFERENCE TO RELATED APPLICATIONS

The present application is a continuation that claims the benefit under 35 U.S.C. §120 to U.S. patent application Ser. No. 12/506,130, entitled "HOST-LEVEL POLICIES FOR GLOBAL SERVER LOAD BALANCING," filed Jul. 20, 2009, which in turn is a continuation that claims the benefit under 35 U.S.C. §120 to U.S. patent application Ser. No. 10/839,919, entitled "HOST-LEVEL POLICIES FOR GLOBAL SERVER LOAD BALANCING," filed May 6, 2004, assigned to the same assignee as the present application, and which are incorporated herein by reference in their entireties.

TECHNICAL FIELD

This disclosure relates generally to load balancing among servers. More particularly but not exclusively, the present disclosure relates to techniques to achieve load balancing by, in response to resolving a DNS query by a client, using host-level policies to provide an address of a server that is expected to serve the client with a high performance in a given application.

BACKGROUND INFORMATION

Under the Transmission Control Protocol/Internet Protocol (TCP/IP), when a client provides a symbolic name (a Uniform Resource Locator or URL) to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The client first provides the host name portion to a local name resolver, which then queries a local Domain Name System (DNS) server to obtain a corresponding IP address. If a corresponding IP address is not locally cached at the time of the query, or if the time-to-live (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS server for responding to future queries regarding the same host name, until the TTL of the IP addresses expires.

To provide some load sharing among the host servers, global server load balancing (GSLB) switches are sometimes used as proxies for authoritative DNS servers, together with one or more site switches each associated with one or more host servers. Each site switch provides the GSLB switch with current site-specific information related to the host servers associated with the site switches. When the DNS server sends the list of IP addresses in response to a client query, the GSLB switch evaluates this list by applying a GSLB policy in conjunction with using the information provided by the site switches. The GSLB policy contains, among other possible specifications, the metrics that are to be applied to the list of IP addresses and the order in which they are to be applied to select the best IP address. After the GSLB switch evaluates the addresses returned by the DNS server using the metrics in the policy, the GSLB switch sends the ordered address list, having the optimum address for access listed at the top, to the client. An example of a GSLB system and description of associated metrics are disclosed in U.S. application Ser. No. 10/376,903, entitled "GLOBAL SERVER LOAD BALANCING," filed Feb. 28, 2003, assigned to the same assignee as the present application, and which is incorporated herein by reference in its entirety.

A given GSLB policy may specify which of the metrics are enabled and to be used for selection, parameters for the metrics (such as tolerance, limits, etc.), and the order in which these metrics should be used to evaluate the IP addresses in the DNS reply. Also, a GSLB policy can specify other configuration information, such as returning best IP address only instead of the entire IP list and so on.

Currently, the user (such as a system administrator) can only define such a GSLB policy (or other load balancing policies) globally. This global GSLB policy is applicable to all the domains for which the GSLB switch is providing GSLB. For instance, consider the example where the GSLB switch is providing GSLB for www.foo.com and www.test.com. (Also note in this example that for the domain www.foo.com, "www" is referred to as the "host" and "foo.com" is referred to as the "zone"). The user may define a GSLB policy with the following example metrics and metric-order:
  Health check
  Geographic
  Least-response
This global policy would apply to both www.foo.com and www.test.com.

If the user wants a round-trip time (RTT) metric to be used for selection of the best IP address for the domain www.foo.com but not for the domain www.test.com, then there is currently no provision for this capability. The reason is that if the user enabled the RTT metric, then since the policy is global and applies to all domains, this metric would get enabled for both of the above domains.

BRIEF SUMMARY OF THE INVENTION

One aspect provides a method that defines a host-level policy. The method specifies at least one metric and associated parameters, if applicable, to be used by the defined host-level policy. The host-level policy is applied to a host, and traffic to network addresses associated with the host are load balanced based on at least one metric and associated parameters of the host-level policy applied to that host.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
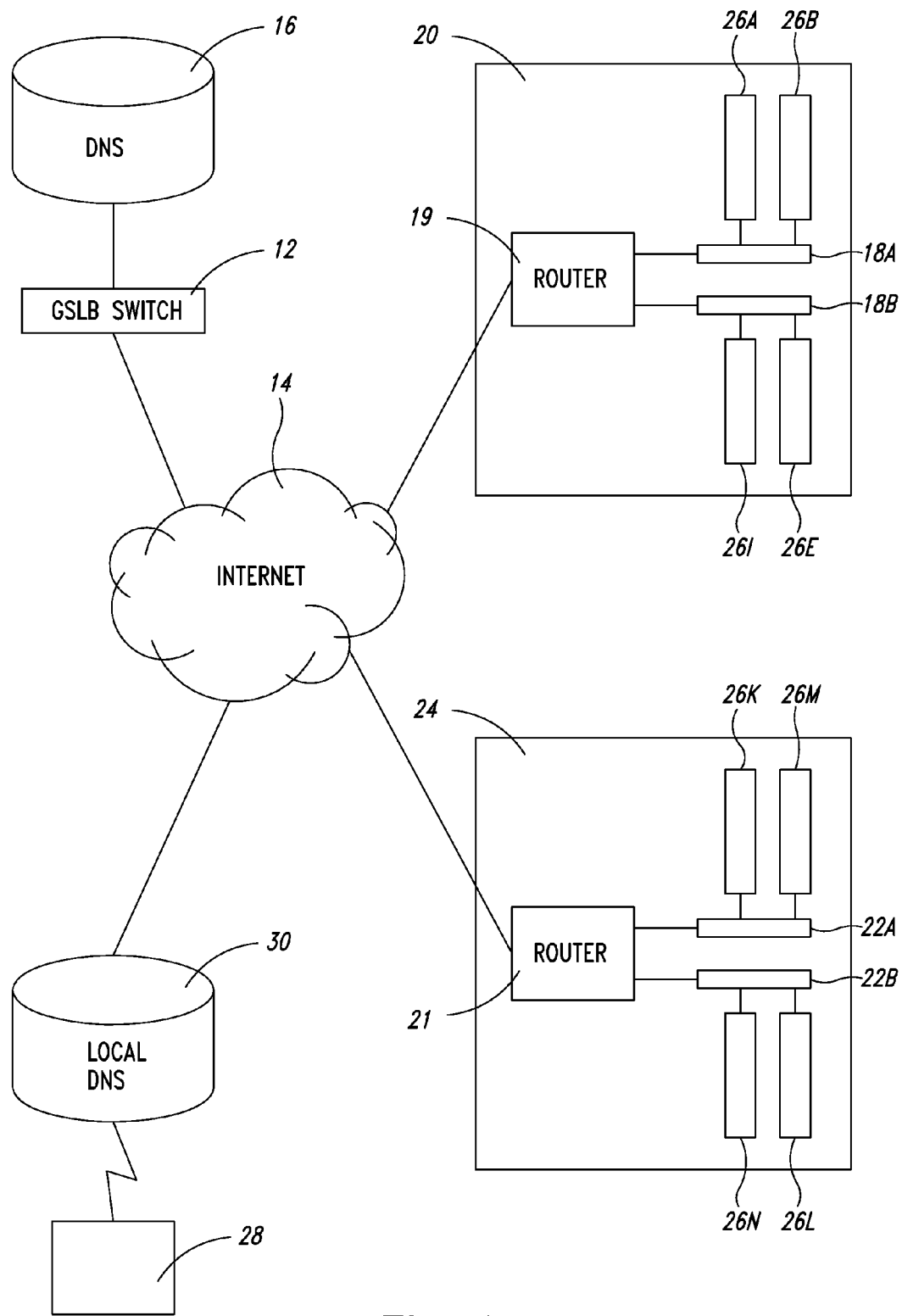
FIG. 1 illustrates a GSLB system in which an embodiment may be implemented.

Embodiments of techniques to provide host-level policies for GSLB are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects.

Reference throughout this specification to "one embodiment" or "an embodiment" means that a particular feature, structure, or characteristic described in connection with the embodiment is included in at least one embodiment. Thus, the appearances of the phrases in "one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment is usable for a network device that provides load balancing capabilities. An example is a GSLB switch that uses a global GSLB policy to provide GSLB for configured domains. Such a GSLB switch is provided with a GSLB host-level policy. Users can define a host-level policy (alternatively or additionally to the global GSLB policy) and apply the host-level policy to hosts in GSLB domains. In effect, the user can enable different policies for different hosts. This allows the user to control the GSLB metrics used for selection, as well as the metric order and additional selection parameters (such as tolerances, various DNS parameters, etc.), at the host level.

If users need this level of granularity for each host, then they can configure various host-level policies and apply them, as desired, to the each of these hosts. Users can also use the global GSLB policy for some hosts and host-level GSLB policy for other hosts. Alternatively, users can continue to use the global GSLB policy for all hosts, or use the host-level policies for all hosts (eliminating the use of the global GSLB policy).

GSLB host-level policies provide enormous flexibility for various GSLB implementations. Users can define different host-level policies to reflect the selection criteria they wish to use for different GSLB domains and provide improved and more tailored GSLB selection for each of those GSLB domains.

The GSLB host-level policy implementation of one embodiment comprises of:

Defining a GSLB host-level policy;
Configuring parameters for the host-level policy; and
Applying the host-level policy to GSLB host(s).

The parameters for a GSLB host-level policy can be changed at any time after the policy has been defined, and any time before or after the policy has been applied to GSLB hosts. Any type of suitable software command or language can be used to program the GSLB switch with the host-level policy. Command line interface (CLI) commands, for instance, may be used to configure the host-level policy.

The following provides an illustration of the use of host-level policies for an implementation where the GSLB switch provides load balancing for the domains www.foo.com and www.test.com. First, a user defines a host-level GSLB policy (e.g., metric selection and order of application) called "H1" as follows:

Health check
Geographic
Round-trip time
Least response.

The user then defines another host-level GSLB policy called "H2" as follows:

Health check
Geographic
Least response.

The user defines the host "www" for the zone foo.com and associates the GSLB host-level policy H1 with it. The user then defines the host "www" for the zone test.com and associates the GSLB host-level policy H2 with it. Thus, when the GSLB switch selects the best IP address for the domain www.foo.com, the GSLB host-level policy H1 is used for that selection. If best IP address selection is to be made for www.test.com, then the GSLB host-level policy H2 is used for that selection. If the user does not associate a host-level policy for a host, then the global GSLB policy will be associated with that host by default in an embodiment.

FIG. 1 illustrates one example global server load balancing system with which an embodiment may be implemented. As shown in FIG. 1, a GSLB switch 12 (i.e., a load balancing switch) is connected to an Internet 14 and acts as a proxy to an authoritative Domain Name System (DNS) server 16 for a domain "foundrynet.com" (for example). That is, while the authoritative DNS server 16 provides the actual DNS service, the IP address known to the rest of the Internet 14 for the authoritative DNS server 16 of the domain "foundrynet.com" is a virtual IP (VIP) address configured on the GSLB switch 12. Of course, authoritative DNS server 16 can also act simultaneously as an authoritative DNS for other domains. The GSLB switch 12 communicates, via the Internet 14, with site switches 18A and 18B at site 20, site switches 22A and 22B at site 24, and any other similarly configured site switches. The site switches 18A, 18B, 22A and 22B are shown, for example, connected to routers 19 and 21 respectively and to servers 26A, . . . , 26I, . . . 26N. Some or all of the servers 26A, . . . , 26I, . . . , 26N may host application server programs (e.g., http and ftp and others). These host servers are reached through the site switches 18A, 18B, 22A and 22B using one or more virtual IP addresses configured at the site switches, which act as proxies to the host servers.

A suitable switch for implementing either the GSLB switch 12 or any of the site switches 18A, 18B, 22A and 22B is the ServerIron® (SI) product available from Foundry Networks, Inc. of San Jose, Calif. Throughout this description and in the figures, the GSLB switch will be described as the network device that can provide and implement the various load balancing (e.g., host-level and/or global load balancing policies) of an embodiment. It is understood that this use of the GSLB or SI switch is merely for purposes of illustration and explanation. Any suitable non-SI switch or non-SI network device can be used to implement the various geographic features and functions described herein. A router is one example.

FIG. 1 also shows a client program 28 connected to the Internet 14, and that communicates with a local DNS server 30. When a browser on the client program 28 requests a web page, for example, using a Universal Resource Locator (URL), such as http://www.foundrynet.com/index.htm, a query is sent to the local DNS server 30 to resolve the symbolic host name www.foundrynet.com to an IP address of a host server. The client program 28 receives from the DNS server 30 a list of IP addresses corresponding to the resolved host name. This list of IP addresses is either retrieved from the local DNS server 30's cache, if the TTL of the responsive IP addresses in the cache has not expired, or obtained from the GSLB switch 12, as a result of a recursive query.

Unlike the prior art, however, this list of IP addresses is ordered by the GSLB switch 12 based on performance metrics. The GSLB switch 12 of one embodiment can use at least some of the following metrics to evaluate the server IP addresses in a DNS reply:

The server's health (including Layer 4 and application health checks)

The weighted IP value assigned to an IP address (i.e., an administratively configured traffic distribution method for the GSLB switch 12 based on weights for IP addresses)

The weighted site value assigned to a site (i.e., an administratively configured traffic distribution method for the GSLB switch 12 based on weights for GSLB sites)

The site switch's session capacity threshold

The IP address with the highest number of active bindings (preference for the IP address with the highest number of active bindings)

The round-trip time between the remote site switch and the DNS client's sub-net

The geographic location of the server

The connection load (e.g., the site switch's average number of new connections per second)

The site switch's available session capacity

The site switch's flashback speed (e.g., how quickly the GSLB switch 12 receives the health check results)

The site switch's administrative preference (e.g., a numeric preference value assigned to influence the GSLB policy by the user if other policy metrics are equal)

The least response selection (i.e., the site switch that has been selected less often than others)

Round robin selection (an alternative to the least response metric).

The above metrics and their parameters may be configured and used in either or both host-level or global GSLB policies, except as noted below for some specific embodiments. The specifics of the above-listed metrics are described in further detail in U.S. application Ser. No. 09/670,487, entitled "GLOBAL SERVER LOAD BALANCING," filed Sep. 26, 2000; in U.S. application Ser. No. 10/206,580, entitled "GLOBAL SERVER LOAD BALANCING," filed Jul. 25, 2002 (disclosing embodiments of a connection-load metric for GSLB); in U.S. application Ser. No. 10/305,823, entitled "DISTRIBUTED HEALTH CHECK FOR GLOBAL SERVER LOAD BALANCING," filed Nov. 27, 2002 (disclosing embodiments for distributing health check tasks to peer metric agents); and in U.S. application Ser. No. 10/376,903, entitled "GLOBAL SERVER LOAD BALANCING," filed Feb. 28, 2003 (disclosing embodiments of weighted site, weighted IP, and active bindings metrics).

Other applications that disclose GSLB features (including metrics) are U.S. application Ser. No. 09/670,487, entitled "GLOBAL SERVER LOAD BALANCING," filed Sep. 26, 2000; U.S. application Ser. No. 10/211,822, entitled "STATISTICAL TRACKING FOR GLOBAL SERVER LOAD BALANCING," filed Aug. 1, 2002; U.S. application Ser. No. 10/377,364, entitled "METHOD AND SYSTEM TO CLEAR COUNTERS USED FOR STATISTICAL TRACKING FOR GLOBAL SERVER LOAD BALANCING, filed Feb. 28, 2003; U.S. Application Ser. No. 10/214,921, entitled "CANONICAL NAME (CNAME) HANDLING FOR GLOBAL SERVER LOAD BALANCING, filed Aug. 7, 2002; U.S. application Ser. No. 10/674,627, entitled "GLOBAL SERVER LOAD BALANCING SUPPORT FOR PRIVATE VIP ADDRESSES, filed Sep. 29, 2003; U.S. application Ser. No. 10/840,496, entitled "CONFIGURABLE GEOGRAPHIC PREFIXES FOR GLOBAL SERVER LOAD BALANCING," filed May 6, 2004; and U.S. application Ser. No. 10/924,552, entitled "SMOOTHING ALGORITHM FOR ROUND TRIP TIME (RTT) MEASUREMENTS FOR GLOBAL SERVER LOAD BALANCING," filed Aug. 23, 2004; all of which are assigned to the same assignee as the present application and incorporated herein by reference in their entireties. These are a few example applications where various GSLB performance metrics are described. For the sake of brevity, these various metrics and the manner in which they are used in a GSLB algorithm or policy (whether at the host level or at the global level) to identify best sites in a list of IP addresses are only summarized and not described in detail herein. Such additional details may be found in these co-pending applications and in the applications that they reference.

In the remainder of this detailed description, for the purpose of illustrating embodiments only and except where indicated, the list of IP addresses returned are assumed to be the virtual IP addresses configured on the proxy servers at switches 18A, 18B, 22A and 22B (sites 20 and 24). In one embodiment when the authoritative DNS server 16 resolves a host name in a query and returns one or more IP addresses, the GSLB switch 12 determines (using the performance metrics) which site switch would provide the best expected performance (e.g., response time) for the client program 28 and returns the IP address list with a virtual IP address configured at that site switch placed at the top. (Other forms of ranking or weighting the IP addresses in the list can also be possible.) The client program 28 can receive the ordered list of IP addresses, and typically selects the first IP address on the list to access the corresponding host server.

Figure 2:
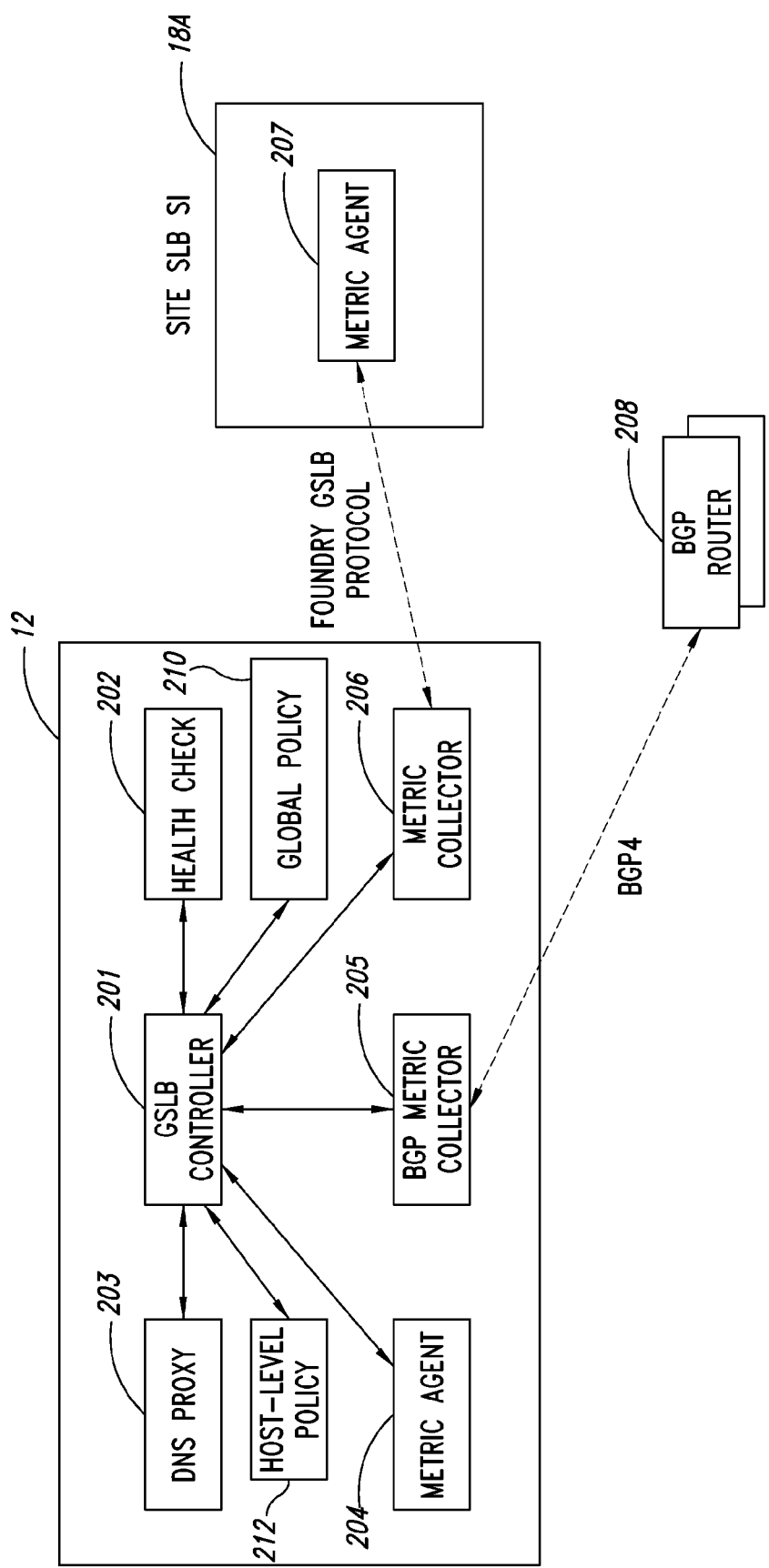
FIG. 2 illustrates a GSLB switch of FIG. 1 according to an embodiment.

FIG. 2 is a block diagram showing the functional modules of an embodiment of the GSLB switch 12 and site switch 18A (for instance) relevant to the global server load balancing function, including functions and features associated with global and host-level policies. As shown in FIG. 2, the GSLB switch 12 includes a GSLB switch controller 201, health check module 202, DNS proxy module 203, metric agent 204, routing metric collector 205, and metric collector 206. The GSLB switch controller 201 provides general control functions for the operation of the GSLB switch 12. The health check module 202 is responsible for querying, either periodically or on demand, host servers and relevant applications hosted on the host servers to determine the "health" (e.g., whether or not it is available) of each host server and each relevant application. The metric collector 206 communicates with metric agents in site-specific switches (e.g., FIG. 2 shows the metric collector 206 communicating with a remote metric agent 207 of a site server load balancing ServerIron® or "SLB SI") to collect site-specific metrics (e.g., number of available sessions on a specific host server and/or connection-load data indicative of connections-per-second at that host server at the site 18A, or other metrics data).

The routing metric collector 205 collects routing information from routers (e.g., topological distances between nodes on the Internet). FIG. 2 shows, for example, a router 208 providing the routing metric collector 205 with routing metrics (e.g., topological distance between the load balancing switch and the router), using the Border Gateway Protocol (BGP). The DNS proxy module 203 (A) receives incoming DNS requests, (B) provides the host names to be resolved to the DNS server 16, (C) receives from the DNS server 16 a list of responsive IP addresses, (D) orders the IP addresses on the list received from the DNS server 16, using the metrics collected by the routing-metric collector 405 and the site specific collector 406, and values of any other relevant parameter, and (E) provides the ordered list of IP addresses to the requesting DNS server. Since the GSLB switch 12 can also act as a site switch, the GSLB switch 12 is provided with the metric agent 204 for collecting metrics for a metric collector.

In one embodiment, the GSLB switch controller 201 can be programmed with and/or can access data to be used for host-level policies (as well as default global policies) and their associated metrics, including at least one of weighted site, weighted IP, active bindings, geographic, RTT, or other metrics described in the co-pending applications identified above. In such an embodiment, the GSLB switch controller 201 can be communicatively coupled to a first storage unit 212 that contains one or more configured GSLB host-level policies. These host-level policies can in turn specify, for each host, the metrics to be used for selection of IP addresses, the order in which the metrics are to be applied, the parameters for the metrics (such as tolerance, limits, and the like), or other associated settings. The GSLB switch controller 201 can also be communicatively coupled to a second storage unit 210 that contains one or more global GSLB policies, some of which may be default policies in some embodiments.

In an embodiment, the first storage unit 212 and the second storage unit 210 can be in the form of databases having tables. It is appreciated, however, that either or both of these storage units can be embodied by any suitable data structure (including file systems, directory structures, variables, static or dynamic code, or any other suitable technique or structure that can accept and store policy settings and data). Additionally, the first and second storage units need not necessarily be separate, and may be integrated in whole or in part into a single storage unit, for instance.

Figure 3:
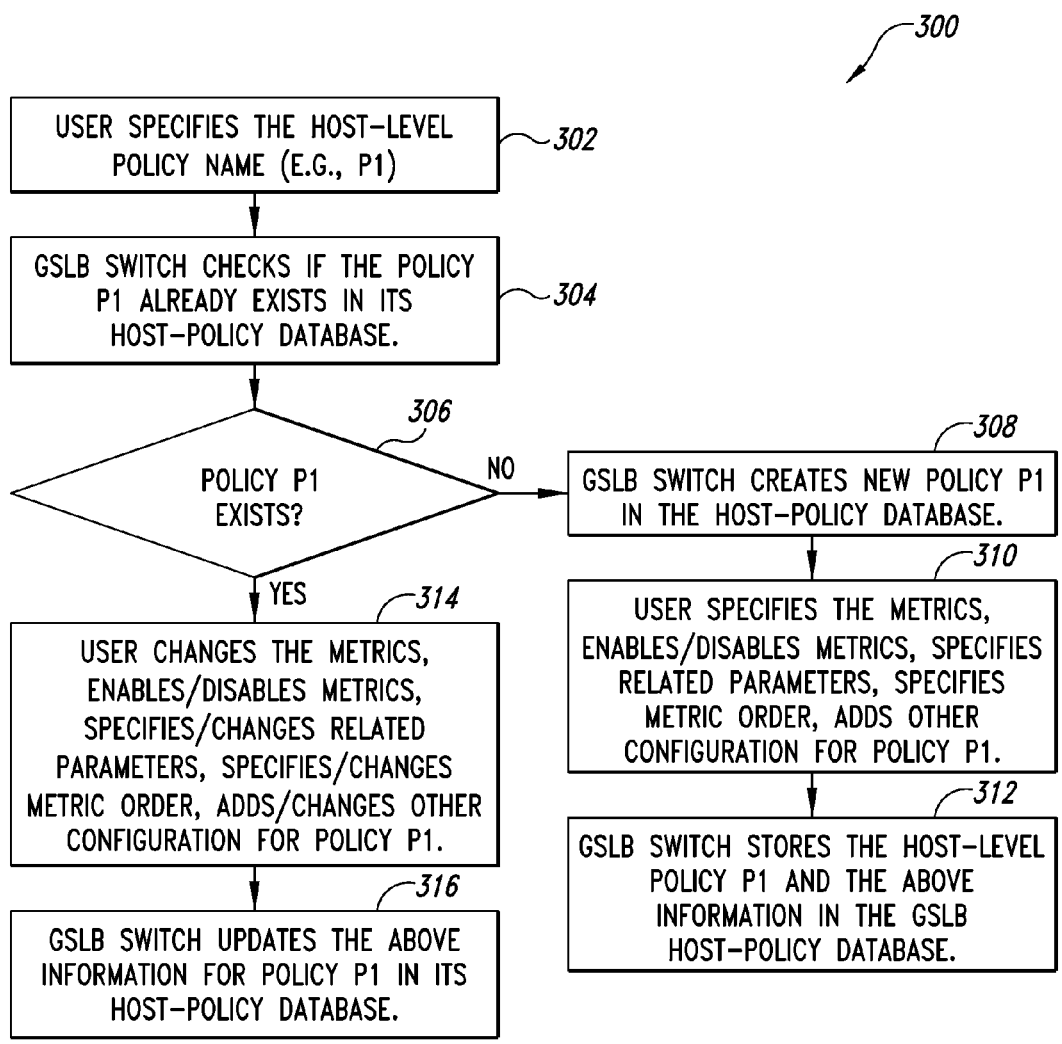
FIG. 3 is a flowchart of an embodiment of a technique to configure/modify a host-level policy on the GSLB switch of FIG. 2.

FIG. 3 is a flowchart 300 of an embodiment of a technique to configure/modify a host-level policy on the GSLB switch 12 (e.g., on the GSLB controller 201). In one embodiment, at least some of the operations depicted in the flowchart 300 (as well as in the other flowcharts shown herein) can be embodied in software, code, or other machine-readable instruction stored on a machine-readable medium, and which are executable by one or more processors. For instance, the software may be stored in the storage units 210 and/or 212 and executable by the GSLB controller 201. It is appreciated that the various operations need not necessarily occur in the exact order depicted, and that certain operations can be added, removed, modified, or combined.

Beginning at a block 302, the user specifies a host-level policy name, such as "P1" for purposes of illustration. At a block 304, the GSLB switch 12 (or more specifically, the GSLB controller 201) checks if the policy P1 already exists in the host-policy database (i.e., the storage unit 212). If the policy P1 is determined to not exist therein at a block 306, then the GSLB switch 12 creates new policy "P1" in the host-policy database in the storage unit 212 at a block 308.

At a block 310, the user specifies the metrics, enables/disables metrics, specifies related parameters, specifies the metric order, and adds other configuration settings for the policy P1. In an embodiment, most of the parameters that can be configured for the global GSLB policy (stored in the storage unit 210) can also be configured for the host-level GSLB policy. For any parameter that can be defined in the global GSLB policy but not under the host-level policy, the GSLB switch 12 of an embodiment will use the parameter from the global GSLB policy for the host-level policy.

For the sake of brevity, not all of the host-level metric configuration and/or parameter configuration that can be performed at the block 310 will be described herein, since such configuration can be based at least in part on the global GSLB policy configuration. However, a description of configuration considerations for some metric parameters and other host-level policy configuration are nevertheless provided herein, so as to provide a thorough understanding of various embodiments:

The capacity threshold parameter (for the session capacity metric) of one embodiment can only be configured for the global GSLB policy and the threshold value defined for the global GSLB policy will be used by the host-level policy When the connection-load metric is enabled for a host-level policy, the actual value of the connection-load limit and other connection load parameters will be obtained from the global GSLB policy. These parameters include: site connection limit, sampling intervals and sample rate, and interval weights. According to one example embodiment, if the connection-load limit is not configured in the host-level policy but is configured in the global GSLB policy, and this host-level policy is applied to a host, then the connection-load metric will not be used during GSLB selection process for that host/zone. Therefore, the connection-load limit configuration for the host-level policy serves as way to enable or disable connection-load metric for the host when it is enabled in the global GSLB policy.

When both the health check metric and the flashback metric are disabled for a host-level policy, an embodiment of the GSLB switch 12 will not perform any Layer 4 TCP or Layer 7 application health checks for the hosts/zones that this policy is applied to. Commands may be entered to change the tolerances for the response times of TCP and application health checks, when used as a selection metric. The user can change one or both tolerance values, and the tolerance values do not need to be the same. For each tolerance, the user can specify from 0-100, for instance. An example default setting for each tolerance value is 10.

The order in which the various metrics identified herein are to be applied can be specified or modified at the block 310, such as by specifying the metrics in a list. In an embodiment, there are no parameters for the least response selection or round robin selection metrics, since these metrics are tie-breakers. Only one of them is enabled at a time in such an embodiment, and the one that is enabled will be the last metric in the host-level policy. A CLI command may be used to reset the order of GSLB policy metrics (or to re-enable all disabled metrics).

The round robin selection metric is an alternative to the least response selection metric as the final tie breaker. When the user enables round robin selection, the GSLB switch 12 automatically disables the least response selection metric, and instead uses the round-robin algorithm for GSLB selection.

The user can enable or disable the RTT metric and configure the RTT tolerance for the host-level policy at the block 310. Other parameters, in particular, RTT cache interval, RTT cache prefix, and RTT explore percentage can be configured only for the global GSLB policy but not for the host-level policy in one embodiment. If the host-level policy is applied to a host/zone, then the GSLB switch 12 will use the values defined in the global GSLB policy for RTT parameters that cannot be configured under the host-level policy. These parameters are: RTT cache interval, RTT cache prefix length, and RTT explore percentage.

According to one embodiment, certain GSLB parameters are not configurable at the host level. For instance, the following configurations/commands are not supported at the host policy level: configuring a geographic prefix; configuring a static prefix; configuring a health-status reporting interval; and configuring a GSLB protocol update interval. These commands are configured under the global GSLB policy, and they will be applicable to all hosts irrespective of whether the global GSLB policy or a host-level policy is being used for the hosts.

Certain DNS parameters may also be configured at the block 310 for a host-level policy. For example:

The GSLB switch 12 can be configured to remove IP addresses from DNS replies, for the GSLB domains that this host-level policy is applied to, when those IP addresses fail a health check.

The GSLB switch 12 can be configured to remove all addresses except the best address, from the DNS replies for the domain names that this host-level policy is applied to.

In one embodiment, GSLB switch 12 uses all other DNS parameters that can be configured under the global GSLB policy but not the host-level policy, from the global GSLB policy for the hosts this policy has been applied to. These parameters include:

cache-proxy: Enabling/disabling directly generating DNS responses with the best choice among IP addresses learned from the DNS server 16 check-interval: Frequency of verifying current DNS records with DNS servers cname-detect: Enabling/disabling auto detection of CNAME aliases configured for GSLB override: Replace IP addresses in DNS responses with the best choice among the configured IP addresses transparent-intercept: Intercept DNS queries and generate responses with the best choice among configured IP addresses ttl: TTL value in the DNS responses' resource records.

The various parameter settings and other information described above may be configured into the GSLB switch 12 using CLI commands or other suitable user-entry technique. At a block 312, the GSLB switch 12 stores the host-level policy P1 and all the above information in the GSLB host-policy database at the storage unit 212.

Back at the block 306, if the GSLB switch 12 determines that the host-level policy P1 already does exist in the host-policy database, then the user may change the metrics, enable/disable metrics, specify/change related parameters, specify/change metric order, or add/change other configuration settings for the policy P1 at a block 314. Then, the GSLB switch 12 updates the above information for the policy P1 in the host-policy database at a block 316.

Figure 4:
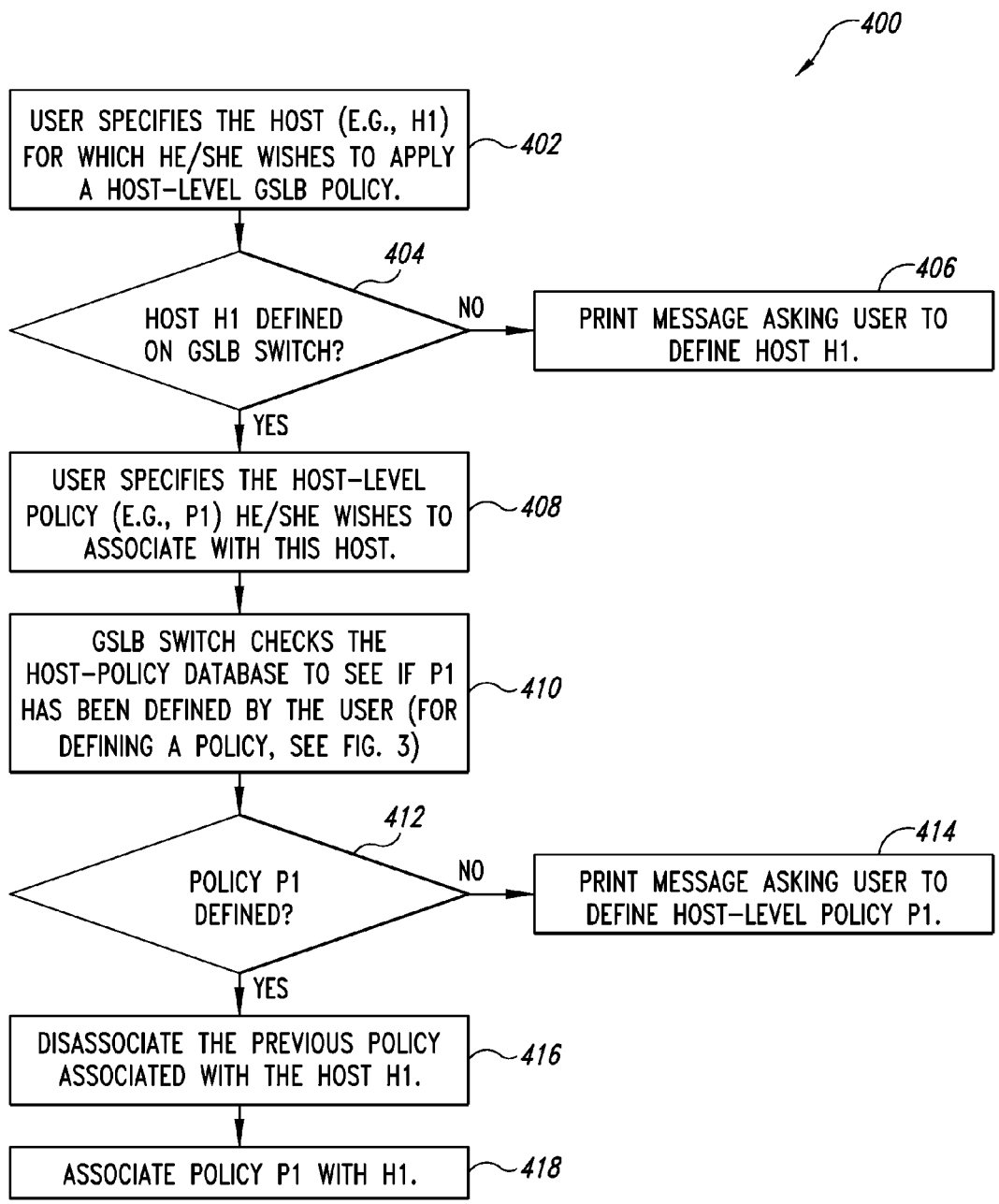
FIG. 4 is a flowchart depicting application of a host-level policy to a host according to one embodiment.

FIG. 4 is a flowchart 400 depicting application of a host-level policy to a host according to one embodiment. At a block 402, the user specifies (such as via CLI commands) the host (e.g., referred to herein as the host "H1" for illustrative purposes) for which the user wishes to apply a host-level GSLB policy. At a block 404, the GSLB controller 201 determines whether the host H1 has been defined on the GSLB switch 12. If the host H1 has not been defined, then a message or other notification is printed (or otherwise presented) to the user at a block 406, to request the user to define the host H1.

If, however, the GSLB controller 201 determines at the block 404 that the host H1 has been defined on the GSLB switch 12, then the user can specify at a block 408 the host-level policy (e.g., the policy P1) that the user wishes to associate with this host H1. At a block 410, the GSLB switch 12 checks the host-policy database to determine if the policy P1 has been defined by the user, such as depicted in FIG. 3. If the policy P1 is found at a block 412 to not have been defined, then a message or other notification is printed (or otherwise presented to the user) at a block 414, requesting the user to define the host-level policy P1.

If, at the block 412, the policy P1 is determined to have been defined, then any previous policy associated with the host H1 is disassociated from that host at a block 416. The new policy P1 is associated with the host H1 at a block 418.

Figure 5:
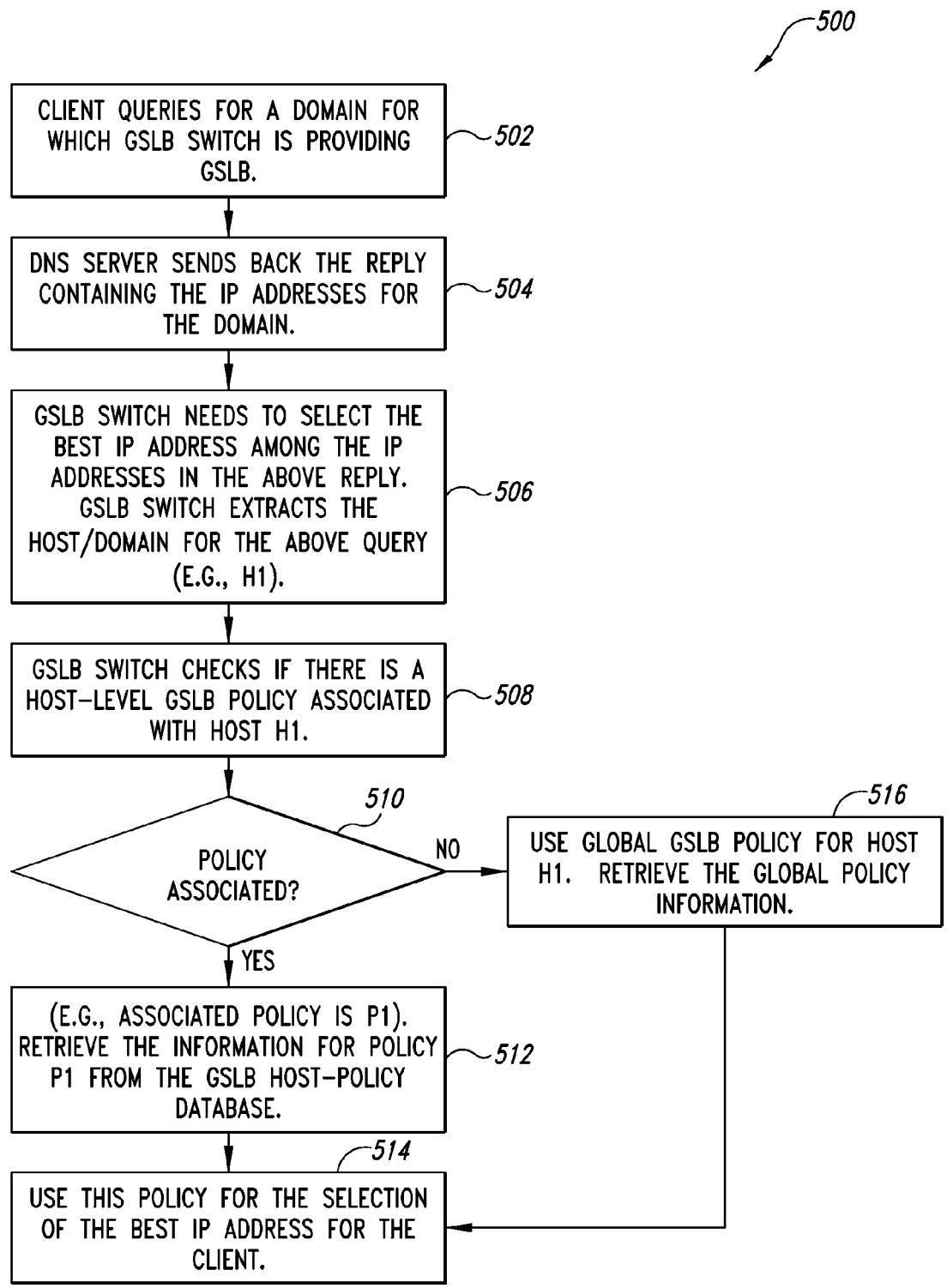
FIG. 5 is a flowchart 500 depicting use of a host-level policy for selection of addresses during the GSLB process.

FIG. 5 is a flowchart 500 depicting use of a host-level policy for selection of addresses during the GSLB process. First at a block 502, the client program 28 queries for a domain for which GSLB switch 12 is providing GSLB. At a block 504, the authoritative DNS server 16 sends back a reply containing the IP addresses for the requested domain.

At a block 506, the GSLB switch 12 receives this reply, and needs to select the best IP address among the IP addresses listed in the reply. The GSLB switch 12 extracts the host/domain for the above query (e.g., the host H1). The GSLB switch 12 checks if there is a host-level GSLB policy associated with the host H1 at a block 508.

At a block 510, the GSLB switch 12 determines whether there is any host-level policy associated with the host H1. If it is determined that there is an associated host-level policy (e.g., the policy P1), then the GSLB switch 12 retrieves the information for the policy P1 from the GSLB host-policy database at a block 512. The GSLB switch 12 uses this host-level policy P1 for the selection of the best IP address for the client program 28 at a block 514.

Back at the block 510, if it is determined that there is no host-level policy associated with the host H1, then the GSLB switch 12 uses the global GSLB policy for the host H1 at a block 516. This global policy information is retrieved, and then used for the selection of the best IP address at the block 514.

A final illustration ties together the above-described concepts. Consider an example where the GSLB switch 12 is providing GSLB for the following three domains:

www.gslb1.com (IP addresses: 1.1.1.101 (Active), 1.1.1.23 (Down), 1.1.1.54 (Down)};

ftp.gslb1.com (IP addresses: 1.1.1.78 (Active), 1.1.1.76 (Down)}; and ftp.foo.com (IP addresses: 1.1.1.101 (Active), 1.1.1.23 (Active), 1.1.1.63 (Down)}.

The user defines (and stores in the GSLB host-policy database) a host-level policy named "test" as follows:

Metric order: health check, least response

Use DNS best-only (i.e., return only the best IP address to the client, and discard the other IP addresses in the response).

The user now configures the following global GSLB policy as follows:

Metric order: health check, least response

The user then applies the host-level policy "test" to the host "www" for the zone gslb1.com and to the host "ftp" for the zone foo.com. Since the user does not associate the domain ftp.gslb1.com with any host-level policy, this domain will be associated with the global GSLB policy by default according to an embodiment.

If the client program 28 queries for the domain www.gslb1.com, then the GSLB switch 12 evaluates the IP addresses in the response from the DNS server 16. In particular, an embodiment of the GSLB switch 12 extracts the host ("www") and domain ("gslb.com") and retrieves the policy associated with it (e.g., the host-level policy "test" in this example). The GSLB switch then evaluates the IP addresses 1.1.1.101, 1.1.1.23, and 1.1.1.54 using the metrics at a metric order specified in the host-policy "test" (e.g., health check, least response). Since 1.1.1.101 is the only IP address that passes the health check, this address is selected as the best IP address. Furthermore, the GSLB switch 12 returns only this address and discards the other two addresses, since DNS best-only is enabled in the host-level policy "test." If the client program 28 queries for the domain ftp.gslb1.com, since the global policy is in effect for this host, the GSLB switch 12 will return all the IP addresses for this domain with the best IP address on the top (e.g., the GSLB switch 12 returns the IP addresses 1.1.1.78, 1.1.1.76).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, various embodiments have been described above in terms of IP addresses. It is appreciated that other embodiments for using GSLB host-level policies can be implemented for systems that use an addressing scheme that is not necessarily IP-address based.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    storing a first load balancing policy associated with a first domain and a second load balancing policy associated with a second domain different from the first domain; and
    ranking, by a load balance switch, network addresses associated with the first domain according to the first load balancing policy; and
    ranking, by said load balance switch, network addresses associated with the second domain according to the second load balancing policy.

2. The method of claim 1 wherein said network addresses, associated with the first domain and to be ranked by the load balance switch, are contained in a domain name system (DNS) reply received by the load balance switch.

3. The method of claim 1 wherein:
    said ranking network addresses associated with the first domain includes ordering, by the load balance switch, the network addresses associated with the first domain according to at least one metric specified in the first load balancing policy; and
    said ranking network addresses associated with the second domain includes ordering, by the load balance switch, the network addresses associated with the second domain according to at least one metric specified in the second load balancing policy.

4. The method of claim 1 wherein said storing the first load balancing policy and the second load balancing policy includes storing the first and second load balancing policies in the load balance switch.

5. An apparatus, comprising:
    at least one storage unit to store a first load balancing policy associated with a first domain and a second load balancing policy associated with a second domain different from the first domain; and
    a load balance switch, communicatively coupled to said at least one storage unit, to rank network addresses associated with the first domain according to the first load balancing policy and to rank network addresses associated with the second domain according to the second load balancing policy.

6. The apparatus of claim 5 wherein said network addresses, associated with the first domain and to be ranked by the load balance switch, are contained in a domain name system (DNS) reply received by the load balance switch.

7. An article of manufacture, comprising:
    a storage medium having instructions stored thereon that are executable by a processor of a load balance switch to enable load balancing, by:
    ranking, by said load balance switch, network addresses associated with a first domain according to a first load balancing policy; and
    ranking, by said load balance switch, network addresses associated with a second domain according to a second load balancing policy,
    wherein said second domain is different from said first domain.

8. The article of manufacture of claim 7 wherein said network addresses, associated with the first domain and to be ranked by the load balance switch, are contained in a domain name system (DNS) reply received by the load balance switch.

9. The article of manufacture of claim 7 wherein:
    said ranking network addresses associated with the first domain includes ordering, by the load balance switch, the network addresses associated with the first domain according to at least one metric specified in the first load balancing policy; and
    said ranking network addresses associated with the second domain includes ordering, by the load balance switch, the network addresses associated with the second domain according to at least one metric specified in the second load balancing policy.

10. An apparatus, comprising:
    storage means for storing a first load balancing policy associated with a first host and a second load balancing policy associated with a second host different from the first host; and
    network device means for ranking network addresses associated with the first host according to the first load balancing policy and for ranking network addresses associated with the second host according to the second load balancing policy.

11. The apparatus of claim 10 wherein said network device means includes a load balancing switch.

12. The apparatus of claim 10 wherein said network addresses, associated with either or both the first and second hosts and to be ranked by the network device means, are contained in a domain name system (DNS) reply received by the network device means.

13. The apparatus of claim 10 wherein:

said ranking network addresses associated with the first host includes ordering, by the network device means, the network addresses associated with the first host according to at least one metric specified in the first load balancing policy; and said ranking network addresses associated with the second host includes ordering, by the network device means, the network addresses associated with the second host according to at least one metric specified in the second load balancing policy.

14. The apparatus of claim 10 wherein said network device means is also configured for ranking network addresses associated with at least a third host according to a global load balancing policy.

* * * * *